Aug. 26, 1952 — A. U. BRYANT — 2,608,209
FLOW CONTROL VALVE
Filed April 15, 1947 — 2 SHEETS—SHEET 1
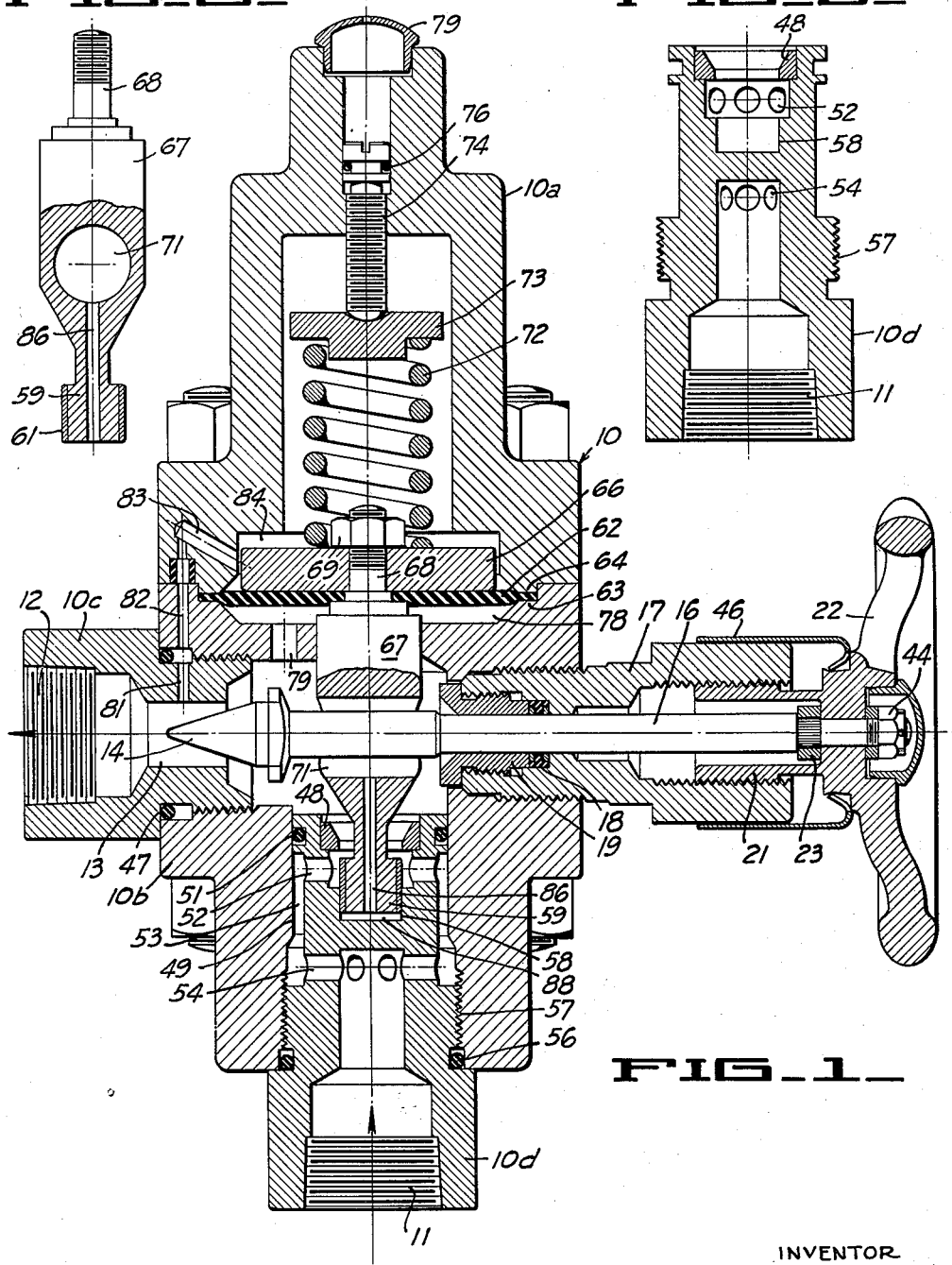
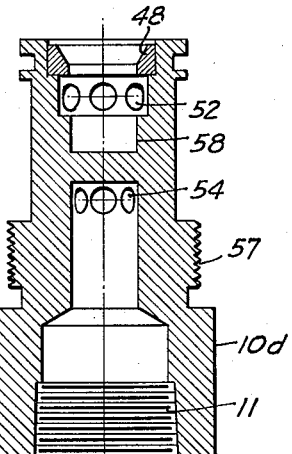
INVENTOR
Austin U. Bryant
BY
Paul D. Flehr
ATTORNEY

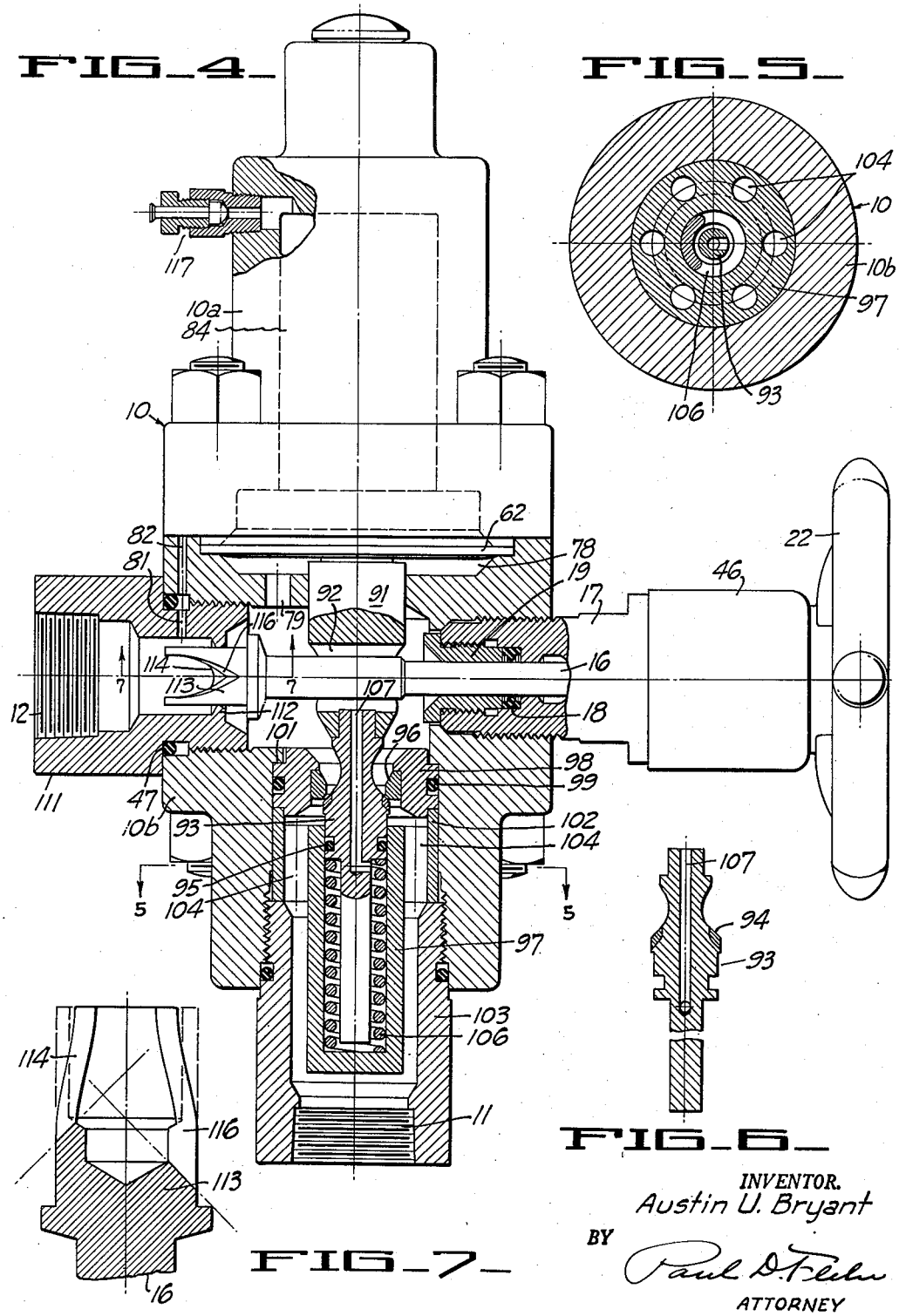

Patented Aug. 26, 1952

2,608,209

UNITED STATES PATENT OFFICE 2,608,209

FLOW CONTROL VALVE

Austin U. Bryant, Berkeley, Calif., assignor, by mesne assignments, to Grove Regulator Company, a corporation of California Application April 15, 1947, Serial No. 741,638

3 Claims. (Cl. 137—501)

This invention relates generally to devices for automatically controlling the rate of flow of various liquids such as oil, water or the like.

It is an object of the invention to provide a device of the above character which is capable of maintaining a predetermined rate of flow irrespective of any pressure changes which may occur either in the line ahead of the device, or in the line to which the liquid is being delivered.

A further object of the invention is to provide a device of the above character which is relatively compact, and which incorporates both automatic control and manual adjustment features.

Another object of the invention is to provide a device of the above character having novel automatic means to maintain a predetermined and fixed pressure differential across a manually adjustable flow control orifice. In this connection the invention is characterized by use of a novel type of balanced valve operated by a diaphragm or like fluid pressure actuated member.

Additional objects of the invention will appear from the following description in which the preferred embodiment has been set forth in detail in conjunction with the accompanying drawing.

Referring to the drawing:

Figure 1 is a side elevational view in section illustrating a device incorporating the present invention.

Figure 2 is a detail illustrating that part of the device which connects with a fluid pressure operated diaphragm, and which cooperates with a stationary valve seat.

Figure 3 is a detail in section illustrating a fitting on the inlet side of the device which forms a mounting for the valve seat.

Figure 4 is a view similar to Figure 1, but showing a modification of the invention.

Figure 5 is a cross sectional detail taken along the line 5—5 of Figure 4.

Figure 6 is a sectional detail showing the valve member 96 incorporated in the flow control valve of Figure 4.

Figure 7 is a detail in section on an enlarged scale showing the manually operated flow control member 113 incorporated in the device of Figure 4.

There are many industrial applications where it is desired to provide a device capable of automatically maintaining a predetermined and fixed pressure differential across a flow control orifice. By the use of such a device it is possible to automatically maintain a predetermined rate of flow of a liquid, irrespective of pressure changes which may occur in the inlet and outlet pipe connections. One application in particular which can be mentioned is use in connection with hydraulic systems for pumping oil wells. One such system makes use of a power pumping unit connected to a hydraulic manifold, which in turn has individual connections to a plurality of well pumping units. If it is attempted to control the distribution of liquid to the separate well pumping units by ordinary valves or adjustable orifices, operation of the system is made unreliable and erratic due to factors causing pressure variations in the system, such as waxing of the lines, variable bottom hole pressures, changing fluid heads or heading of the well, etc. Application of an automatic flow control device of the character to be presently described greatly improves the operation of such hydraulic systems, and makes it possible to automatically compensate for such pressure variables and thus provide for operation over long periods of time without continual manual supervision.

The present invention makes use of two serially connected orifices, one of which is adjusted manually, and the other operating automatically. The several parts are combined to form a compact unitary apparatus, which can be readily installed in the hydraulic piping leading to the individual producing wells.

The device as illustrated in Figures 1 to 3 of the drawing consists generally of a body 10, which is preferably formed in a number of parts, including the top dome or bonnet 10a, the main body part 10b, and the fittings 10c and 10d. The inlet and outlet passages 11 and 12 in fittings 10c, 10d are adapted for attachment with associated piping.

Fitting 10c is formed to provide a flow control orifice 13, within which is the characterized or tapered flow control plug 14. This plug is attached to one end of an operating stem 16, which extends to the exterior of the body through the bonnet 17. Suitable sealing or packing means 18 serves to seal around stem 16, and is retained by the threaded gland follower 19. The exterior end of the bonnet 17 is interiorly threaded for engagement with the threaded member 21 carried by the hand wheel 22. Collar 23 and nut 44 on the outer end of the stem 16 serve to attach the latter to the hand wheel. A suitable cylindrical shaped shroud 46 is shown carried by the hand wheel and surrounds the exterior end of the bonnet in order to serve as an indicator and to protect the threaded engagement described above. It will be evident that turning the hand wheel 22 serves to adjust the positioning of tapered plug 14, and in general serves to adjust the effective cross sectional flow area of orifice 13. Fitting 10c is sealed with respect to the body by suitable means such as the resilient O ring 47.

The inner end of the body fitting 10d serves to carry the annular seat ring 48. That portion of the body fitting 10d surrounding the ring 48 is sealed with respect to the body bore 49 by suitable means such as the resilient O ring 51. Also the fitting 10d is ported and relieved to provide a direct flow connection between the inlet side of the seat ring 48 (the under side as illustrated), and the inlet passage 11. Thus ports 52 immediately underlie the seat 48, and connect with the annular passage 53, which in turn connects with the inlet passage 11 through the radial extending ports 54. An additional sealing means such as the resilient O ring 56 serves to seal between the body fitting 10d and the adjacent end portion of the body, and a simple threaded connection 57 between the parts facilitates removal of the fitting 10d, together with the seat ring 48.

Adjacent the seat ring 48 and on the inflow side of the same the body fitting 10d is formed to provide the cylindrical shaped bore 58 which serves to accommodate the cylindrical piston-like valve member 59. This valve member may be provided with a suitable facing 61 of wear resisting metal, such as a hard alloy. The exterior diameter of the piston-like valve member 59 is only slightly less than the throat diameter of the valve seat 48.

The piston-like valve member 59 is operated by use of a fluid operated member such as the flexible diaphragm 62. The peripheral edge portion of this diaphragm is clamped between the annular shoulders 63, 64, formed respectively upon the body parts 10b and 10a. The upper side of the diaphragm is engaged by the diaphragm plate 66, and attached to the diaphragm and to the plate 66 there is a member 67 which carries the valve member 59. The upper end of member 67 is provided with suitable means such as a threaded stud 68 which extends through the center of the diaphragm and the diaphragm plate and is engaged by nut 69 to clamp the parts together. The connecting member 67 is provided with an opening 71 extending transversely through the same, and which serves to accommodate the stem 16. Thus the axes of these parts are at right angles to each other and intersecting.

Above the diaphragm there is a compression spring 72 which has its one end seated upon the diaphragm plate 66, and its other end engaging the thrust washer 73. A screw 74 is threaded within the adjacent portion of the body and has its inner end seated upon the thrust member 73. Screw 74 is sealed with respect to the body by suitable means such as the resilient O ring 76. A removable closure cap 79 can be provided to enable application of a screw driver or like tool to the screw 74, when it is desired to adjust the same.

The opposite sides of the flexible diaphragm 62 present substantially equal fluid pressure areas to which fluid pressures from the opposite sides of the orifice 13 are applied. Thus the space 78 immediately below the diaphragm 62 is connected by duct 79 to the inlet side of the orifice 13. Connecting ducts 81, 82 and 83 establish communication between the outlet side of orifice 13 and the space 84 above the diaphragm.

In order that the valve member 59 may be substantially balanced, a duct 86 is provided in member 67 (see Figure 2) and which extends from opening 71 to the lower end face of valve member 59.

Operation of the device described above is as follows: Assuming that it is used in a hydraulic pumping system of the type previously described, the inlet passage 11 is connected by piping to the central pumping unit, and the outlet passage 12 connects to piping leading down into an oil producing well. The position of the tapered plug 14 is adjusted manually in order to adjust the flow rate to the desired value, for a given setting of the loading spring 72. The setting of the loading spring 72 adjusts the pressure differential to be maintained across the orifice 13. In a typical instance this may be 50 p. s. i. as set by the factory. Assuming that a flow of liquid through the device is established, the static pressures upon opposite sides of the orifice 13 are transmitted to the opposite sides of the diaphragm 62, whereby the valve member 59 is positioned automatically to control the flow through the seat ring 48 in such a manner as to maintain the pressure differential across orifice 13 substantially constant. Automatic positioning of the valve member 59 automatically compensates for variations in the pressure applied from the central pumping unit to passage 11 or variations in pressure on the outflow side of the device due to such factors as waxing, changing well pressures, varying fluid heads or heading of the well. Thus the flow rate to the well through the orifice 13 is maintained substantially constant, with the result that the hydraulically operated pump individually installed in each well will be properly operated at all times, independently of operation of other wells connected to the same central pumping unit. The forces acting on diaphragm 62 are independent of variations in fluid pressure applied to the inlet passage 11. In this connection it will be noted that the duct 86 connects the space 88 below the valve member 59 with the opening 71. Thus the pressure within the body, that is in the space between seat ring 44 and the orifice 13, is applied to both the underside of the diaphragm 62 and the lower end of the valve member 59. With this arrangement the effective fluid pressure area of the diaphragm 62 which is subjected to the pressure on the inflow side of orifice 13, is formed of the exposed lower face of the diaphragm, the effective exposed area of the member which connects this diaphragm with the valve member 59, and the lower end face of the valve member 59. This over-all effective fluid pressure area is equal to the area of the diaphragm which is exposed to the pressure on the downstream or outflow side of the orifice 13.

The construction is such that the various parts of the device can be readily removed for repair or replacement. Thus stationary seat ring 48 and associated parts can be withdrawn simply by removing the body fitting 10d. The diaphragm, valve member 59, and connecting member 67 can be removed with associated parts by detaching body part 10d, and by removing the stem 16 in the manner previously described.

Figures 4 to 7 inclusive illustrate another and preferred embodiment of the invention. In this instance the diaphragm is attached to the upper end of member 91, which has an opening 92 to accommodate the rod 16. A lower member 93 is attached to the member 91, and is provided with a conical valve surface 94 of a suitable hard alloy bonded to the member 93 and cooperating with the valve seat ring 96. The lower portion of member 93 forms a plunger or piston which slidably fits within the cylinder sleeve 97 and which is sealed by suitable means such as the resilient O ring 95.

In order to conveniently assemble the parts associated with the valve means just described, the seat ring 96 is carried by a removable mounting ring 98, which in turn is sealed by the resilient O ring 99, and is normally held against the annular shoulder 101 of the body. Mounting ring 98 is held in place by the sleeve 102, which in turn is retained by the threaded fitting 103. Cylinder 97 is an integral part of sleeve 102 and is provided with circumferentially spaced ports 104. A compression spring 106 is disposed within the cylinder 97, and serves to urge the movable valve member toward closed position. A duct 107, corresponding to the duct 86 of Figure 1, connects the opening 92 with the space within the cylinder 97.

Body fitting 111 corresponds to the part 10c of Figure 1, and is provided with a valve seat 112 through which the valve member 113 extends. The outer periphery of valve member 113 is cylindrical and in the form of a tube having V-shaped flow slots 114, 116 on its opposite sides. The arrangement just described forms in effect a characterized valve member which is more convenient and effective than the corresponding valve arrangement of Figure 1.

In order to facilitate making adjustments of the device a small manually operated valve 117 is mounted upon the upper body part 10a, and can be manipulated by the operator for the purpose of venting gas from the space above the diaphragm 62.

The embodiment of Figures 4 to 7 inclusive operates in substantially the same manner as the first embodiment described in that the forces acting on diaphragm 62 are independent of variations in fluid pressure applied to the inlet passage 11. In this connection it will be noted that the duct 107 connects the space below member 93 and within the cylinder 97 with the opening 92. Thus the pressure within the body is applied to both the underside of the diaphragm 62 and the lower end of the member 93. With this arrangement the effective fluid pressure area of the diaphragm 62 which is subjected to the pressure on the inflow side of the valve seat 112 is formed of the exposed lower face of the diaphragm 62, the effective exposed area of the member 91 which connects the diaphragm with the valve member 93, and the lower end face of the valve member 93. This over-all effective fluid pressure area is equal to the area of the diaphragm which is exposed to the pressure on the downstream or outflow side of the valve seat 112. It is possible in this embodiment for the valve to be shut off tight since the member 93 is provided with a conical hard alloy valve surface 94 cooperating with a valve seat ring 96. This is not possible with the slide valve of Figure 1 since, as stated, the exterior diameter of member 59 is less than the throat diameter of the valve seat 48.

I claim:

1. In a fluid flow control valve, a body provided with inlet and outlet openings, the body being formed to provide a flow control orifice interposed between said passages, manually operated means for adjusting the effective cross sectional area of said orifice, a movable fluid pressure operated member carried by the body and providing fluid pressure areas on opposite sides of the same, means serving to apply pressure from the inlet side of the orifice to one of said areas, means for applying a fluid pressure from the outlet side of said orifice to the other one of said areas, a stationary valve seat carried by the body, the throat orifice of said seat being interposed between the inlet side of said flow orifice and the inlet side of the body, a valve member associated with said seat on the inflow side of the same, said valve member presenting a fluid pressure area to the inlet side of the orifice, a piston carried by the valve member, the body providing a cylinder on the inlet side of said seat and within which said piston operates, there being a closed space formed within the cylinder at the end of said piston remote from said seat, said last named end of the piston presenting a fluid pressure area which is substantially equal to said fluid pressure area presented by the valve member, means forming a connection between said valve member and said fluid pressure operated member, and a duct serving to transmit fluid pressure from the space between said flow orifice and said seat to the closed space within said cylinder.

2. In a flow control valve, a body provided with inlet and outlet openings, means forming a flow control orifice interposed between said openings, a longitudinally movable stem extending into the body, a member mounted upon the inner end of said stem and extending into said orifice, whereby upon manual adjustment of said stem the effective cross-sectional area of the orifice is adjusted, a movable fluid pressure operated diaphragm on one side of the stem, that side of the diaphragm which faces the stem being exposed to fluid pressure on the inlet side of the control orifice, a stationary valve seat carried by the body on that side of the stem diametrically opposite to the fluid pressure operated diaphragm and having its throat orifice interposed between the inlet side of said control orifice and the inlet passage of the body, means forming a cylinder on the inlet side of said seat, a piston fitted within said cylinder and movable in opposite directions toward and away from said seat on the inlet side of the latter, there being a closed space formed within the cylinder at the end of said piston remote from said seat, a valve member attached to the piston and cooperating with said seat, said valve member presenting an effective fluid pressure area to the inlet side of the control orifice which is substantially equal to the fluid pressure area presented by that end of the piston which is remote from the valve seat, a member rigidly connecting said valve member to said diaphragm, said last named member being provided with an opening extending transversely through the same, said stem being disposed to extend through said opening, means for applying fluid pressure from the outlet side of said orifice to one side of said diaphragm, and means for applying fluid pressure from the outlet side of said orifice to the other side of said diaphragm and a duct extending through said last named connecting member and also through said valve member and said piston and serving to connect said opening to the space within said cylinder.

3. In a flow control valve, a body provided with inlet and outlet openings adapted to be connected with associated piping, a flow control orifice interposed between said passages, an orifice control member, an operating stem movably extending into the body and having its inner end attached to said last named member, manual means for adjusting said stem to thereby adjust the effective cross sectional flow area of said orifice, a movable fluid pressure operated member carried by the body on one side of the stem and providing fluid pressure areas on opposite sides of the same, means serving to apply fluid pressure from the inlet side of said orifice to one side of said fluid pressure member, means for applying fluid pressure from the outlet side of said orifice to the other side of said fluid pressure member, a valve seat carried by the body on that side of the stem diametrically opposite to the fluid pressure operated member and having a valve throat orifice communicating between the inlet side of said flow orifice and the inlet passage of the body, a valve member movable in opposite directions relative to said seat, and a member serving to connect said last named valve member to said fluid pressure operated member, said connecting member having an opening to accommodate said valve stem, said stem extending through said opening.

AUSTIN U. BRYANT.

REFERENCES CITED

The following references are of record in the file of this patent:

UNITED STATES PATENTS

| Number | Name | Date |
| --- | --- | --- |
| 1,215,669 | Liese | Feb. 13, 1917 |
| 1,490,654 | Wylie | Apr. 15, 1924 |
| 1,640,842 | Loomis | Aug. 30, 1927 |
| 1,923,595 | Temple | Aug. 22, 1933 |
| 1,982,711 | Vickers | Dec. 14, 1934 |
| 2,306,379 | Conradson | Dec. 29, 1942 |
| 2,445,544 | Trautman | July 20, 1948 |